US007561740B2

(12) United States Patent
Denoue et al.

(10) Patent No.: US 7,561,740 B2
(45) Date of Patent: Jul. 14, 2009

(54) SYSTEMS AND METHODS FOR AUTOMATIC GRAPHICAL SEQUENCE COMPLETION

(75) Inventors: Laurent Denoue, Palo Alto, CA (US); Patrick Chiu, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 795 days.

(21) Appl. No.: 11/008,625

(22) Filed: Dec. 10, 2004

(65) Prior Publication Data

US 2006/0126946 A1    Jun. 15, 2006

(51) Int. Cl.
*G06K 9/00* (2006.01)
*G06K 9/72* (2006.01)
*G06F 17/27* (2006.01)
*G06F 3/048* (2006.01)

(52) U.S. Cl. .................. 382/187; 382/186; 382/189; 382/229; 382/231; 715/266; 715/268; 715/816

(58) Field of Classification Search ............ 715/256, 715/261, 268, 816, 780
See application file for complete search history.

(56) References Cited

U.S. PATENT DOCUMENTS

| | | | | |
|---|---|---|---|---|
| 5,327,342 A | * | 7/1994 | Roy | 345/467 |
| 5,633,955 A | * | 5/1997 | Bozinovic et al. | 382/187 |
| 5,687,254 A | | 11/1997 | Poon et al. | |
| 5,734,749 A | * | 3/1998 | Yamada et al. | 382/187 |
| 5,835,635 A | * | 11/1998 | Nozaki et al. | 382/226 |
| 5,917,941 A | * | 6/1999 | Webb et al. | 382/177 |
| 5,963,666 A | * | 10/1999 | Fujisaki et al. | 382/187 |
| 6,275,611 B1 | * | 8/2001 | Parthasarathy | 382/187 |
| 6,298,154 B1 | * | 10/2001 | Cok | 382/186 |
| 6,377,965 B1 | | 4/2002 | Hachamovitch et al. | |
| 6,863,759 B2 | * | 3/2005 | Richmond et al. | 156/92 |
| 6,956,968 B1 | * | 10/2005 | O'Dell et al. | 382/182 |
| 7,098,896 B2 | * | 8/2006 | Kushler et al. | 345/168 |
| 7,293,231 B1 | * | 11/2007 | Gunn et al. | 345/179 |
| 7,299,424 B2 | * | 11/2007 | Jarrett et al. | 715/863 |
| 7,424,156 B2 | * | 9/2008 | Huang | 382/187 |
| 2003/0099399 A1 | * | 5/2003 | Zelinski | 382/186 |

OTHER PUBLICATIONS

Rath et al., "Word Image Matching Using Dynamic Time Warping," Center for Intelligent Information Retrieval, pp. 1-7, 2003.
Lopresti et al., "On the Searchability of Electronic Ink," Fourth International Workshop on Frontiers of Handwriting Recognition, pp. 1-11 {Dec. 1994}.

(Continued)

*Primary Examiner*—Matthew C Bella
*Assistant Examiner*—Michael A Newman
(74) *Attorney, Agent, or Firm*—Sughrue Mion, PLLC; Pavel I. Pogodin

(57) ABSTRACT

A possible portion providing method involving receiving a pattern provided using a movable member, the pattern corresponding to a traveling path of the movable member, and the provided pattern corresponding to a portion of an intended sequence, determining at least one possible sequence which includes the received pattern, and displaying a remaining portion of the at least one possible sequence using a predefined font set for a plurality of components, the predefined font set including a record of a pattern corresponding to the traveling path of the movable member or another movable member for each of the plurality of components.

30 Claims, 7 Drawing Sheets

OTHER PUBLICATIONS

Hull et al., "Scribble Matching," Hewlett-Packard Co., pp. 1-10 {Jul. 1994}.
Poon et al., "Scribbler: A Tool for Searching Digital Ink," Chi '95 Mosaic of Creativity, pp. 252-253 {May 7-11, 1995}.
Lopresti et al., "Algorithms for Matching Hand-Drawn Sketches," Panasonic Technologies, Inc., 1996.
Igarashi et al., "Pegasus: A Drawing System for Rapid Geometric Design," Dept. of Info. Engineering, Dept. of Info. Science, 1998.
Uchihashi et al., "Automatic Index Creation for Handwritten Notes," FX Palo Alto Laboratory, 1999.

* cited by examiner

SYSTEMS AND METHODS FOR AUTOMATIC GRAPHICAL SEQUENCE COMPLETION

BACKGROUND

Many information processing systems, such as, personal computers including desk-top and portable computers (e.g., TabletPCs), and personal digital assistants (PDAs) are capable of receiving data in the form of gestures, strokes, etc., which correspond, for example, to traditional handwriting (printed and/or cursive). That is, handwritten data, for example, may be entered into an information processing system by moving, for example, an electronic pen on a surface of the information processing system which is able to sense/detect/capture the motion of the electronic pen and accordingly, the graphical sequence or pattern generated by the motion of the electronic pen.

Generally, the majority of the time a user spends using such an information processing system is spent entering data into the system. Accordingly, the speed at which data may be input into the system affects the user's overall efficiency with respect to the processing of that data (e.g., printing, electronically mailing, editing, etc.).

When typewritten data is input using a keyboard, word completion systems are known which help increase the speed at which typewritten data may be input. Such typewritten word completion systems assist in the completion of partial typewritten characters by providing predicted word completions that are also provided in typeset form. U.S. Pat. No. 6,337,965 discloses a system that predicts typewritten word completions for partially entered typewritten words and provides the predicted typewritten word completions for selection by the user. When the user selects one of the provided typewritten predicted word completions by traditional acceptance keystrokes, such as the "tab" key or the "enter" key, the partially entered typewritten word is completed such that the complete typewritten word is displayed and/or entered.

Information processing systems which receive, graphical sequences or patterns (e.g., handwritten words, hand-drawn shapes) as inputs instead of typewritten words, generally convert the input graphical sequences or patterns into known or predefined typeset shapes, such as standard coded characters (e.g., standard data format known as ASCII) so that the data may be utilized in standard processor-based applications, such as word processing, electronic mail, and graphics applications. Generally, in such systems, as soon as, for example, the handwritten graphical sequence or pattern is converted or recognized, the handwritten graphical sequence or pattern is not displayed on the display in the input form (e.g., handwritten form). Instead, the data is generally converted and displayed using a typeset font such that a typeset version of each component is used to display the data (i.e., input graphical sequence or pattern). For example, a typeset version of the letter "a" would be used to display a handwritten "a", and a typeset version of the symbol "Ω" would be used to display a handwritten "Ω". In other systems, for example, the input graphical sequence or pattern is stored as an image and the inputted data is not analyzed/recognized/identified or converted into predefined shapes or characters. In such systems, the image of the input graphical sequence or pattern is used.

In various systems and/or applications, it is desirable and/or necessary to work with or display non-typeset data (e.g., handwritten graphical sequence or pattern) that is input in the same form in which it was input or a form similar thereto (i.e., handwritten form) and not based on a typeset font. That is, it may be preferable and/or necessary for data entered in a handwritten form, for example, using an electronic pen, for example, to be displayed in handwritten form, of the same or a different user, instead of typewritten form even if the input data is recognized or identified, for example.

SUMMARY

It is desirable to provide systems and methods which receive a partial graphical sequence or pattern and provide possible remaining portions of the graphical sequence or pattern in a non-typeset format, which is similar to and/or based on the format in which the partial graphical sequence or pattern was provided in order to increase the speed at which such graphical sequences or patterns may be input.

A possible portion providing method involving receiving a pattern, displaying the received pattern, comparing the received pattern to predefined patterns for each of a plurality of components to determine at least one provided component of the intended sequence, determining at least one possible sequence which includes the at least one provided component, determining at least one remaining component of each of the determined possible sequences, the remaining component being a component of the at least one possible sequence other than the at least one provided component, and displaying at least one remaining component of the at least one determined possible sequence is provided. The received pattern may be provided to an information processing system using a movable member, such that the pattern may be produced by movement, by a user, of the movable member on a receiving portion of the information processing system and the provided pattern corresponds to a portion of an intended sequence. The at least one remaining component being displayed using the predefined pattern for the component, wherein the predefined pattern for each component resembles a pattern which would be produced if the user or another user inputted the component in the receiving portion of the information processing system using the movable member.

A possible portion providing method involving receiving a pattern provided using a movable member, the pattern corresponding to a traveling path of the movable member, and the provided pattern corresponding to a portion of an intended sequence, determining at least one possible sequence which includes the received pattern, and displaying a remaining portion of the at least one possible sequence using a predefined font set for a plurality of components, the predefined font set including a record of a pattern corresponding to the traveling path of the movable member or another movable member for each of the plurality of components.

An information processing system is provided which includes a graphical sequence receiving portion, the receiving portion being capable of receiving graphical sequences based on a traveling path of a movable member, a processor, and a display. The processor determines at least one possible sequence that includes the graphical sequence received by the receiving portion. The display displays the received graphical sequence and at least a remaining portion of at least one determined possible sequence. The displayed remaining portion is displayed using a font set generated by a user, and the font set comprises a graphical sequence for each of a plurality of components, where each graphical sequence was provided by the user by moving the movable member across a surface of the graphical input receiving portion.

These and other optional features and possible advantages of various exemplary embodiments are described in, or are apparent from, the following detailed description of exemplary embodiments of systems and methods for mediating teleconferences.

BRIEF DESCRIPTION OF THE DRAWINGS

Exemplary embodiments described herein will be described in detail, with reference to the following figures, in which:

FIG. 5 is a diagram of an exemplary way possible portions may be provided and/or accepted;

FIG. 6 is a diagram of another exemplary way possible portions may be provided and/or accepted;

DETAILED DESCRIPTION OF EXEMPLARY EMBODIMENTS

Throughout the following description, numerous specific structures/steps of some exemplary embodiments are set forth in order to provide a thorough understanding of the exemplary embodiments. It is not necessary to utilize all of these specific structures/steps.

Systems and methods described herein provide assistance mechanisms for assisting in the entry of non-typeset data which is being entered without the use of a keyboard and more particularly, assistance mechanisms which provide, in non-typeset form, possible portions, such as remaining portions of, for example, a word, phrase, character, segment, stroke, symbol, etc., which may complete the non-typeset data entered thus far. Thus, for example, while a user is entering data, the system and methods described herein work to predict and suggest possible remaining portions of the data that the user has entered thus far. If at least one of the predictions (or the only prediction) is correct, the user can select the provided suggestion and avoid having to enter the remaining portions him/herself. In cases where a user is entering handwritten data, for example, the systems and methods described herein can assist the user such that the user can more efficiently (i.e., the user does not need to enter the data himself), accurately (i.e., the user may enter an incorrectly spelled word, while the system provides correctly spelled suggestions) and generally more neatly (i.e., usually users are rushing and do not enter data in their neatest handwriting) enter the data. More particularly, while the systems and methods described herein provide possible remaining portion(s) using, for example, a predefined font set and not a typeset font, the predefined font set is based, for example, on the user's entered patterns (e.g., traveling paths of a movable member) for a plurality of components (e.g., letters, characters, numbers, shapes, symbols, etc.), generally a user enters such patterns when he/she has more time such that the patterns are generally neater.

Figure 1:
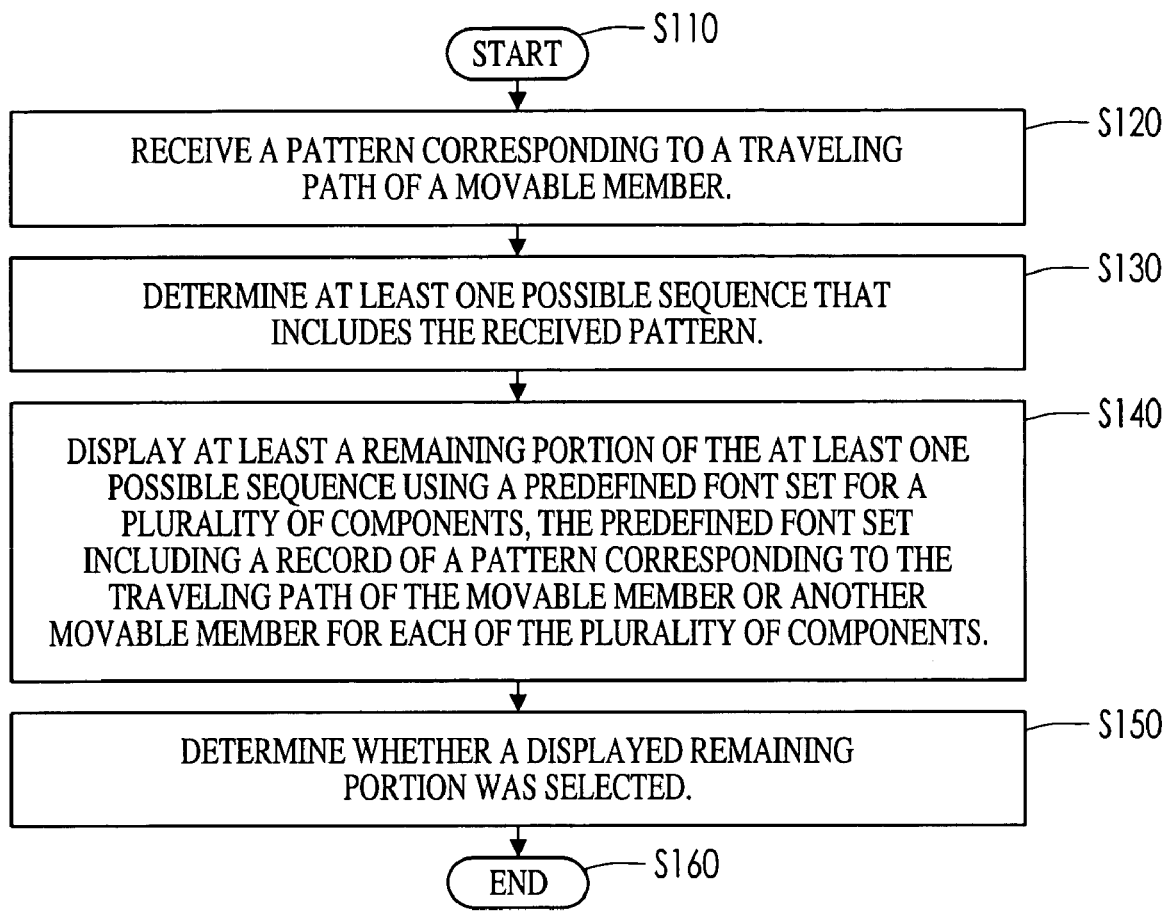
FIG. 1 is a flow chart of an exemplary method for providing a possible remaining portion of a received pattern.

FIG. 1 is a flow chart outlining a general overview of an exemplary process for providing possible remaining portions of a received pattern. The process outlined in FIG. 1 starts at step S110 and at step S120, a pattern corresponding to a traveling path of a movable member is received. After the pattern is received, at step S130, at least one possible sequence that includes the received pattern is determined. At step S140, at least a remaining portion of at least one determined possible sequence is then displayed using a predefined font set (not a typeset font) which is based on a traveling path of a movable member for each of a plurality of components of the font set. Next, at step S150, it is determined whether one or more of the displayed remaining portion(s) was selected. The process ends at step S160.

Figure 2:
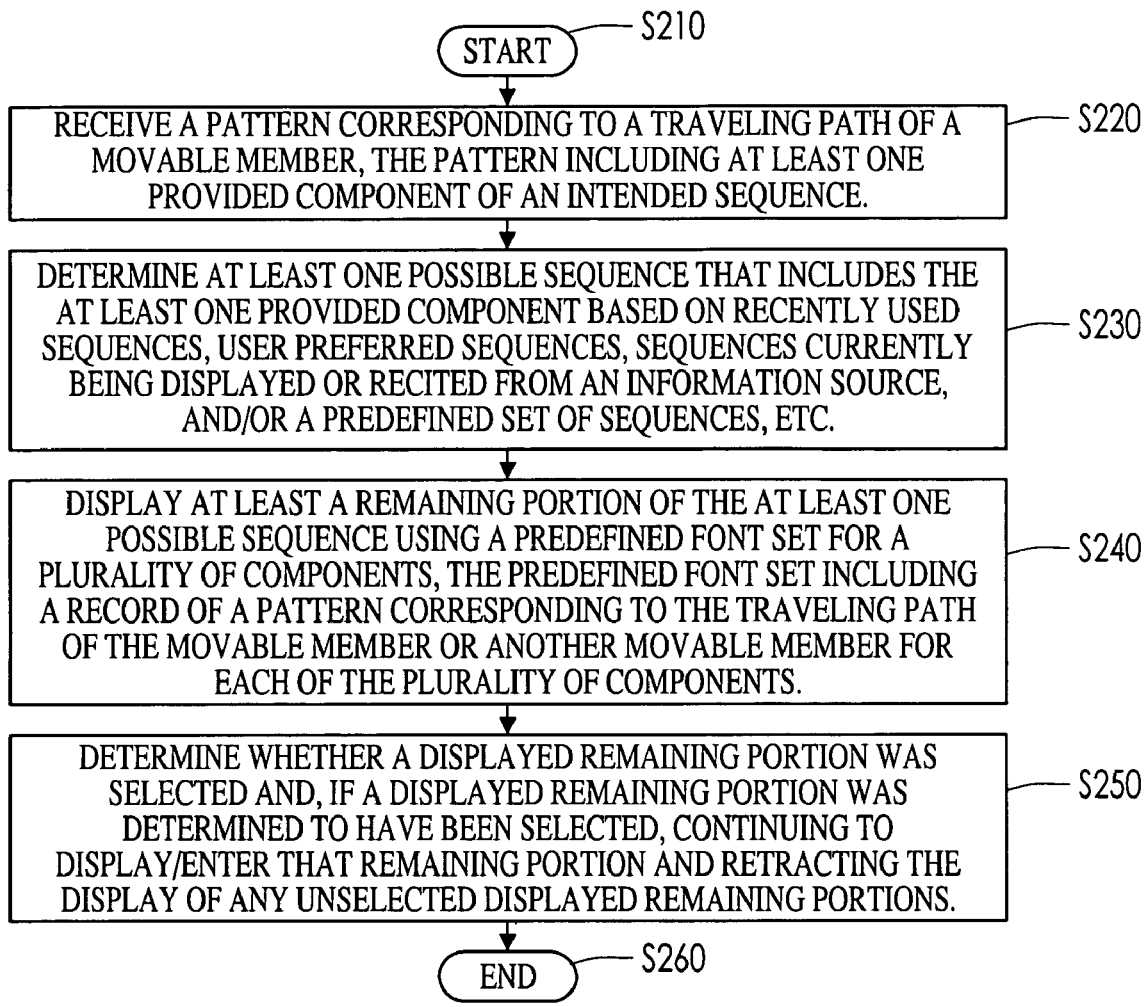
FIG. 2 is a flow chart of another exemplary method for providing a possible remaining portion of a received pattern.

FIG. 2 is a flow chart outlining a more detailed exemplary process for providing possible remaining portions of a received pattern. The process outlined in FIG. 2 starts at step S210, and at step S220 a pattern corresponding to a traveling path of a movable member is received. The received pattern includes at least one provided component of an intended sequence. A provided component may be, for example, a letter, a word, a segment, a stroke, a symbol, etc. More particularly, the received pattern may include, for example, some of the letters of a word or phrase, some of the words of a phrase, some of the numbers of a numerical sequence, some of segments or strokes of a character or symbol, etc. For example, the received pattern may include the letters "Homog" for the word "Homogeneous" or "37 C" for the code section "37 C.F.R. §1.183".

In various systems and methods employing the features described herein, the received pattern (i.e., data entered or inputted) may be handwritten data or any other data which is entered or inputted without the use of a physical keyboard having keys for various letters, numbers, etc., or a keyboard displayed on a display portion of an information processing system with which a key is selected by pressing on the surface of the display portion corresponding to the key of the desired character. In various systems and methods including assistance mechanisms employing one or more features of the exemplary embodiments described herein, a portion of a word, phrase, character or symbol, etc., for example, may be entered by moving a movable member on a surface of a receiving portion of an information processing system in a manner similar to printing or handwriting with a pen or pencil on paper. Similar to the manner in which ink/lead from the pen/pencil is released based on the traveled path of the pen/pencil to form the desired pattern, the traveled path of the movable member corresponds to the entered pattern (i.e., without the ink/lead).

In various systems and methods including the assistance mechanisms employing one or more features of the exemplary embodiments described herein, the movable member may be, for example, an electronic pen which resembles conventional pens and/or pencils, but without the ink or lead. Instead of releasing ink or lead to provide a record of the pattern created by the movement of the pen or pencil, the electronic pen may send signals to the receiving portion of the information processing system based, for example, on light emitted by the electronic pen and received by a sensor of the receiving portion. In various exemplary embodiments, the movable member may send signals to the receiving portion of the information processing system based, for example, on the pressure exerted when the movable member is pressed against the surface of the receiving portion. In cases where the receiving portion detects the pressure exerted by the movable member, the movable member may, for example, be any member, including, for example, a finger, that is capable of exerting pressure on a portion of the receiving portion of the image processing system as it is pressed into or moved across a surface thereof.

After an information processing system or method including the assistance mechanisms employing one or more features of the exemplary embodiments described herein receives a pattern corresponding to a portion of data inputted using a movable member, in some embodiments, the information processing system analyzes the pattern generated by the motion of the movable member in order to determine/identify provided components of the inputted data. That is, for example, if a few letters of a word or phrase, a few strokes of a character or graphical symbol, a word of a phrase, etc., is input using the movable member, the inputted pattern is analyzed to determine what letters, strokes, word(s) are included in the inputted pattern.

In some embodiments, the inputted pattern may be analyzed and/or identified based on an overall shape of the inputted pattern and/or the overall sequence of directions in which the movable member was moved to generate the inputted pattern. An exemplary method for categorizing letters, for example, based on their shapes, for example, is discussed below. By analyzing the inputted pattern, provided components can be identified. That is, for example, words, letters, characters, symbols, and/or phrases, etc. may be identified based on, for example, the general shape of a typeset version of character or a previously or substantially simultaneously entered non-typeset (e.g., handwritten) version of the word, letter, character, symbol, phrase, etc. In some cases, the previously or substantially simultaneously entered non-typeset version of the word, for example, may have been entered by the same user which entered the inputted data which is being analyzed and/or identified or by another user. Known and/or later developed methods for identifying components from provided patterns may also be employed.

After an information processing system or method including the assistance mechanisms employing one or more features of the exemplary embodiments described herein analyzes the inputted data to determine the provided components, at least one possible remaining portion for the portion of the data inputted is be determined in step S230. Possible remaining portions may be determined based, for example, on one or more of most-recently used words, phrases, characters, symbols, etc., the user of the information processing system, the context of the inputted data in view of already entered portions, a lecture or presentation being presented or having been presented, and/or a predefined set of words, characters, and/or phrases etc.

Many sources may be used for determining the at least one possible sequence. For example, recently used sequences, commonly used sequences, user preferred sequences, context dependent sequences, sequences currently being displayed or recited from an available information source and/or a predefined set of sequences are possible sources for determining at least one possible sequence.

The source of the determined possible sequence may affect when, where and/or if at all at least a remaining portion of the determined possible sequence is provided/displayed. That is, several factors may be considered as to whether one or more of the determined possible sequences will be provided/displayed. Possible factors include, for example, the similarity between the received pattern (e.g., pattern inputted by a user using a movable member) and a determined possible sequence which includes the received pattern (i.e., how likely it is that the possible sequence is the intended sequence), whether a user has previously entered a sequence which includes the last pattern provided by the user, whether another associated user has previously entered a sequence which includes the pattern provided by the user, whether the determined possible sequence(s) is from a topic/information source selected by the user, etc., the context of previously provided sequences (e.g., medical, legal, geographical, language (e.g., French, English, etc.), a lecture, a meeting, etc.), and the form in which the determined possible sequence is available in (e.g., typeset sequence vs. non-typeset sequence previously entered by the user or another user). That is, in some embodiments, the system may only provide a determined possible sequence or sequences which include(s) the provided pattern or components if the determined possible sequence meets a certain condition (e.g., previously entered by the user or another user). The condition may be set and saved as a user preference and/or be a selection made prior to pattern entry, for example.

For example, with regard to context, in some embodiments, the system may have an option, selectable by the user, of only providing determined possible portions that fall within the scope of the context of previously entered data, as determined by the system itself based on patterns/data entered thus far. In some embodiments, the system may have an option, selectable by the user, of only providing determined possible sequences that fall within the scope of the context of a topic selected by the user (e.g., French, Iran, Professor X's lecture(s), a book, Kidneys, a graphical book, a dictionary, a web-site, etc.) The topic may be selectable, for example, from a menu or a button/key and/or entered by entering, for example, by writing in the topic. In the case of a lecture, for example, the lecture itself and/or the written information (e.g., slides, accessible files, web-pages, etc.) may be selected, for example. In some embodiments, the system may have an option, selectable by the user, of only providing determined possible sequences that can be provided using his/her own font set and/or based on patterns provided thus far. In some embodiments, the system may have an option, selectable by the user, of only providing determined possible sequences that can be provided using a non-typset font set (i.e., font set generated based on a traveling path of a movable member), while in some embodiments the system, may have an option, selectable by the user, of providing determined possible sequences that meet other specified conditions irrespective of whether possible sequence is in a typeset font or a non-typeset font. While the above exemplary embodiments have been described as only providing determined possible sequences meeting a certain condition, in some embodiments any combination of the above conditions, and/or other conditions may be imposed.

Further, in some embodiments, the conditions may not prevent determined possible sequences from being provided/displayed if the condition is not met by the determined possible sequence. That is, in some embodiments, the conditions may determine the order in Which the determined possible sequences may be displayed/provided. For example, the system may have an option, selectable by the user, of providing/displaying determined possible conditions satisfying a first condition first and those satisfying a second condition second, etc. The priority of the conditions may be set, for example, based on the order in which the condition was selected and/or a selected attribute (e.g., must be met, should be met, 1, 2, . . . n, Group I, Group II, etc.) of the condition. For example, a user may prefer to have possible determined sequences based on the user's own prior inputs displayed first (in time and/or position), determined possible sequences based on any user's prior inputs displayed second (in time and/or position), and determined possible sequences based on typeset versions of data displayed third (in time and/or position).

In some embodiments, depending on the defined priority of the conditions, not all the determined possible sequence(s) may be displayed at once because, depending on the priority list, the determined possible sequence(s) may be displayed in different positions on the display and/or at different times. That is, depending on where in the priority ladder a determined possible sequence is, the determined possible sequence may be the first one displayed (or one of a first group displayed) and/or may be the second one displayed (or part of a second group). In some embodiments, depending on where in the priority ladder a determined possible sequence is, if all the determined possible sequences are substantially simultaneously displayed, the highest priority determined possible sequence may be displayed adjacent to the provided pattern and or immediately next to the provided pattern while the other(s) of the determined possible sequences are listed in order of priority therebelow, for example. It should be understood, that in some embodiments, the conditions may determine both, which of the determined possible sequences will be provided/displayed and in what order.

In the example of the code section provided above, the provided pattern "37 C" could apply to any section of Title 37 of the Code of Federal Regulations and thus, would not be predictable based on "37 C" alone unless only one or a few sections of the code were frequently or recently used and/or one or a few sections of the code were included in a predefined source. For example, if the user only identified 37 C.F.R. §1.183 in the user preferred set of sequences or in the predefined set of sequences, the user can save a lot of time by not having to provide the remaining portion of the sequence. In an embodiment where the system is to provide determined possible portions based on the context of the data (patterns) thus far, the system may identify 37 C.F.R. §1.183 if, for example, previous patterns were related to suspension of rules.

In some embodiments, for example, a group of people may be communicating with each other using their PDAs and, for example, a first group member may enter non-typeset data into his/her PDA substantially simultaneously or slightly before another group member enters similar or the same non-typeset data. When the second group member enters/inputs a portion of the data, the system recognizes/identifies the second group member's data entry based on the first group member's data entry. In some embodiments, the system may provide the second group member with at least the possible remaining portion based on the first group member's data entry and/or based on data available from other sources, using either a font set generated by the second member, the font set generated by the first member, the actually graphical input of the data entered by the first group member, a font set generated by another member, and/or any other non-typeset font.

In some embodiments, for example, a student may be viewing a lecture from a remote location and a professor, who is conducting the lecture in a classroom puts a slide on the screen, when the student takes notes on his/her PDA or TabletPC, for example, the system utilizes the data provided on the professor's slide to analyze, identify and/or recognize the student's data entry/entries in order to determine possible remaining portions of the data entered thus far. Although the data being entered by the student is in non-typeset form (e.g., handwritten), the data provided on the slide may, for example, be handwritten data or typewritten data such that, for example, the general shape of the typeset data may be used to help identify the student's non-typeset data in order to determine possible sequences and provide at least remaining portions of determined possible sequences.

In some embodiments, typeset patterns are used to determine the non-typeset patterns being input. For example, in cases involving the use of a database or pool of possible words, characters, phrases and/or symbols in typeset form, versions of words, characters phrases and/or symbols may, for example, be categorized based on their general shape and/or the general shape of their components (e.g., letters of a word, segments or strokes of a symbol or character).

For example, letters similar to the letter "a", which do not involve upward and/or lower extending portions, may be categorized as normal letters, letters similar to the letter "b", which involve an upward extending portion, may be categorized as ascenders, letters similar to the letter "p", which involve a lower extending portion, may be categorized as descenders, and letters similar to "f", which have some combination of the characteristics of the other categories, may be categorized as combinations.

In some embodiments, the categories may be assigned unique numbers (i.e., a number different from the number of another category), and words, characters, phrases, symbols, etc., may be identified based on sequences of numbers corresponding to the components they include. For example, with words or phrases, a number for the letter type of each letter of the word or phrase may be used to identify the word or phrase. For example, 'normal' letters may be identified by the number 0, ascending letters may be identified by the number 1, descending letters may be identified by the number 2, and combination letters may be identified by the number 3. With such a classification, for example, the word "ink" would be coded as "001" and the word "hello" would be coded as "10110". Such a classification scheme is generally more useful when a limited number of text words are part of the pool of possible letters, words, etc.

In various exemplary embodiments, the inputted pattern may be analyzed/recognized/identified based on a record of the sequence of strokes or segments in the inputted pattern in order to determine what letter(s), character(s), word(s), etc., was/were intended by the inputted pattern. More particularly, for example, a stroke of an inputted pattern generally corresponds to a portion generated between a time when a movable member, for example, is pressed against a surface of a receiving portion and a time when the movable member is lifted off the surface or between a time a light emitted from a movable member is moving and/or capable of being detected. A segment of an inputted pattern generally corresponds to a portion of an inputted pattern generated when a movable member is moved between any of a starting point, an ending point, a turning point (i.e., a point at which a direction of motion of the moving member is changed abruptly), a maximum point and a minimum point of the inputted pattern without necessarily releasing the movable member from the surface of the receiving portion or preventing the movable member from emitting light which may be detected by the receiving portion. In some cases, a portion of the inputted data may correspond to both a stroke and a segment.

In various exemplary embodiments, multiple analysis and/or identification techniques may be employed simultaneously and/or consecutively to determine the provided components and/or to determine possible sequences and/or remaining portions.

After at least one possible sequence is determined, at least the remaining portion of the at least one possible portion is displayed in step S240. In some embodiments, the entire sequence of each possible determined sequence may be displayed. In some embodiments, if, there is only one possible sequence is determined, only the remaining portion (i.e., portion other than the component(s) included in the provided pattern) may be displayed. In some embodiments, even if only one possible sequence is determined, the entire possible sequence may be displayed. In some embodiments, if more than one possible sequence is determined only remaining portions of the determined possible sequences may be displayed. In some embodiments, if more than one possible sequence is determined each of the determined possible sequences may be displayed in full. Further, in some embodiments, the displayed portion is displayed using patterns previously entered by the user or another user during a session of use of the information processing system. In some embodiments, the displayed portion is displayed using a predefined non-typeset font set for a plurality of components.

In various embodiments, the possible portion is provided using a font file generated, for example, by each user. For example, when a user uses the information processing system for the first time, the user is prompted to enter each letter of the alphabet in his/her own handwriting and the pattern produced, by each user, for each letter, is stored. In some embodiments, the pattern produced is stored along with its ASCII value, for example. In other embodiments, the possible portion is provided using a font generated, for example, by another user of the information processing system. Of course, when another user is the source of the predefined font set, for example, the handwriting will likely be different. In some embodiments, the continuity of the handwriting, for example, may not be a concern. In some embodiments, the system may have stored therein a plurality of font sets for a plurality of users and the system may automatically select the predetermined font set of the current user.

In some embodiments, the displayed portion may be provided adjacent to the provided pattern so as to continue the sequence, below the provided pattern, above the provided pattern, etc. In some embodiments, the displayed portion may be provided in a different color or in a dotted line manner, for example, to more clearly differentiate 'suggested possible portions' from provided patterns.

Next, after at least one possible remaining portion is displayed, it is determined whether a displayed remaining portion was selected in step S250. A displayed possible remaining portion may be selected in many ways. For example, a user may use the movable member to press onto the 'correct' displayed possible remaining portion, the user may draw a line through a part or all of the 'correct' displayed possible remaining portion and/or the user may circle all or part of the 'correct' displayed possible remaining portion.

Depending on the response to the displayed possible remaining portion(s), a selected portion may continue to be displayed if it is displayed in the correct location (i.e., adjacent to the provided pattern), a selected portion may be 'moved' to the correct location (i.e., adjacent to the provided pattern) and/or unselected portions may be deleted from the display. The process ends in step S260.

In some embodiments, the information processing system may only provide possible portions if, for example, the possible portion providing mode is selected, or if the user pauses after entering partial data (i.e., incomplete sequence, part of a word, phrase, character or symbol). In some embodiments, there may be a button/key that the user can select if the user desires to have determined possible portions provided. In embodiments, where conditions can be set, after selecting a mode for providing determined possible portions, the system may prompt the user for conditions that can be set. For example, the system may prompt determine possible sequences only from non-typset sources, determine possible sequences from A . . . Z topics, etc. Thus, in such systems, the process also involves determining whether possible portions should be provided/displayed.

In some embodiments, although the system or program, for example, may determine one or more possible portions which include the provided components, the system may consider, for example, the context of the data being inputted and/or the surrounding words and provide all or none of the determined one or more possible portions depending on how relevant and/or likely it is that the determined possible portion may be the intended sequence.

Figure 3:
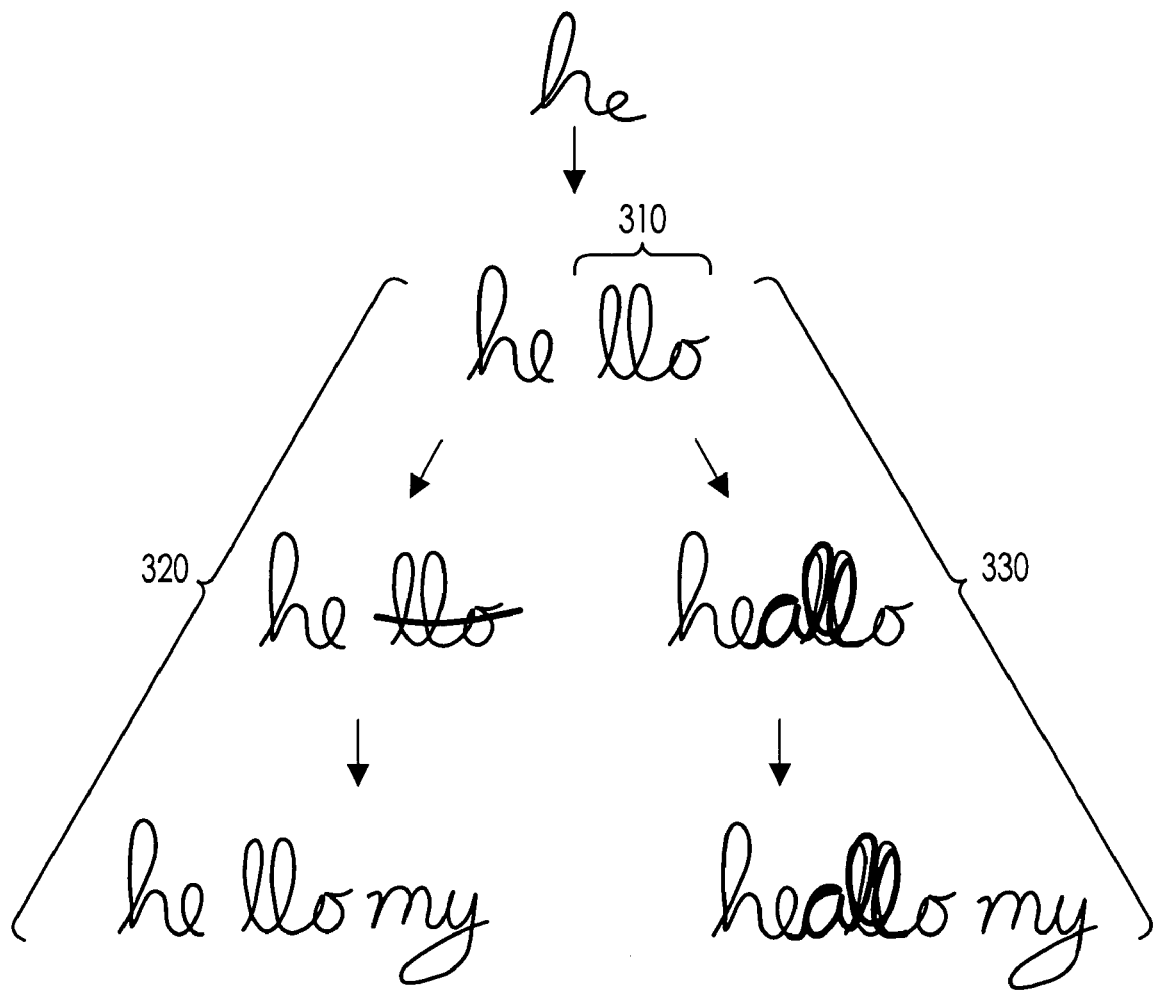
FIG. 3 is a diagram of exemplary possible portion providing scenarios when the pattern "he" is received.

FIG. 3 is a diagram of exemplary possible portion providing scenarios when the pattern "he" is received by an information processing system. For example, after a user inputs the pattern "he" the system may determine that one possible sequence including the provided pattern is the word "hello" and one possible remaining portion to the provided pattern is "llo". Since the system only determined one possible portion, the system may only display the remaining portion adjacent to the provided pattern, below the provided pattern or above the provided pattern, or the system may display the complete possible sequence "hello" above or below the provided pattern, for example. In the example illustrated in FIG. 3, the possible remaining portion "llo" 310 is provided adjacent to the provided pattern "he". If the intended sequence was "hello", then the user may select the provided possible remaining portion, by for example, drawing a line through it and then proceed with entering the next portion of the data "my", as shown in branch 320 of FIG. 3. On the other hand, if the intended sequence is something other than "hello", then the user may continue inputting the 'intended' sequence "heal" and further continuing with "heal my", as shown branch 330 of FIG. 3.

Figure 4:
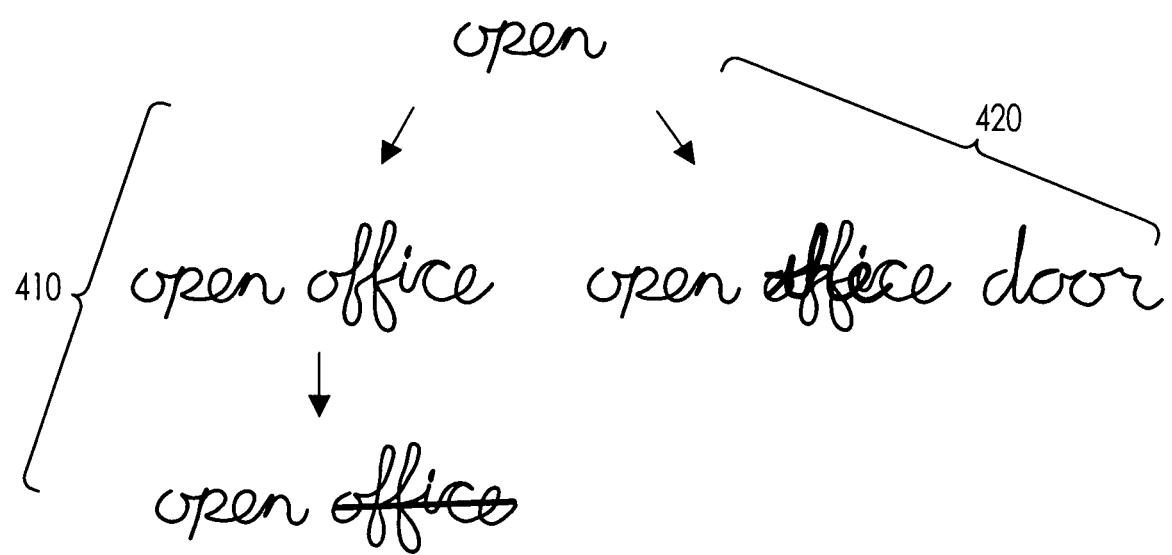
FIG. 4 is a diagram of exemplary possible portion providing scenarios at the word level when the pattern "open" is received.

FIG. 4 is a diagram of exemplary possible portion providing scenarios at the word level when the pattern "open" is received. In the example shown in FIG. 4, the user entered in the pattern for the word "open" and the system predicts that the intended sequence or phrase is "open office" and thus provides or displays the remaining portion "office" of the intended sequence "open office". As shown in branch 410, if the system correctly predicted the sequence, then the user may draw a line through the provided portion to accept the provided possible portion in order to avoid having to input the portion him/herself. On the other hand, if the system incorrectly predicted the user's intended sequence, as shown in branch 420, the user continues entering the pattern for the intended sequence.

Figures 5, 6:
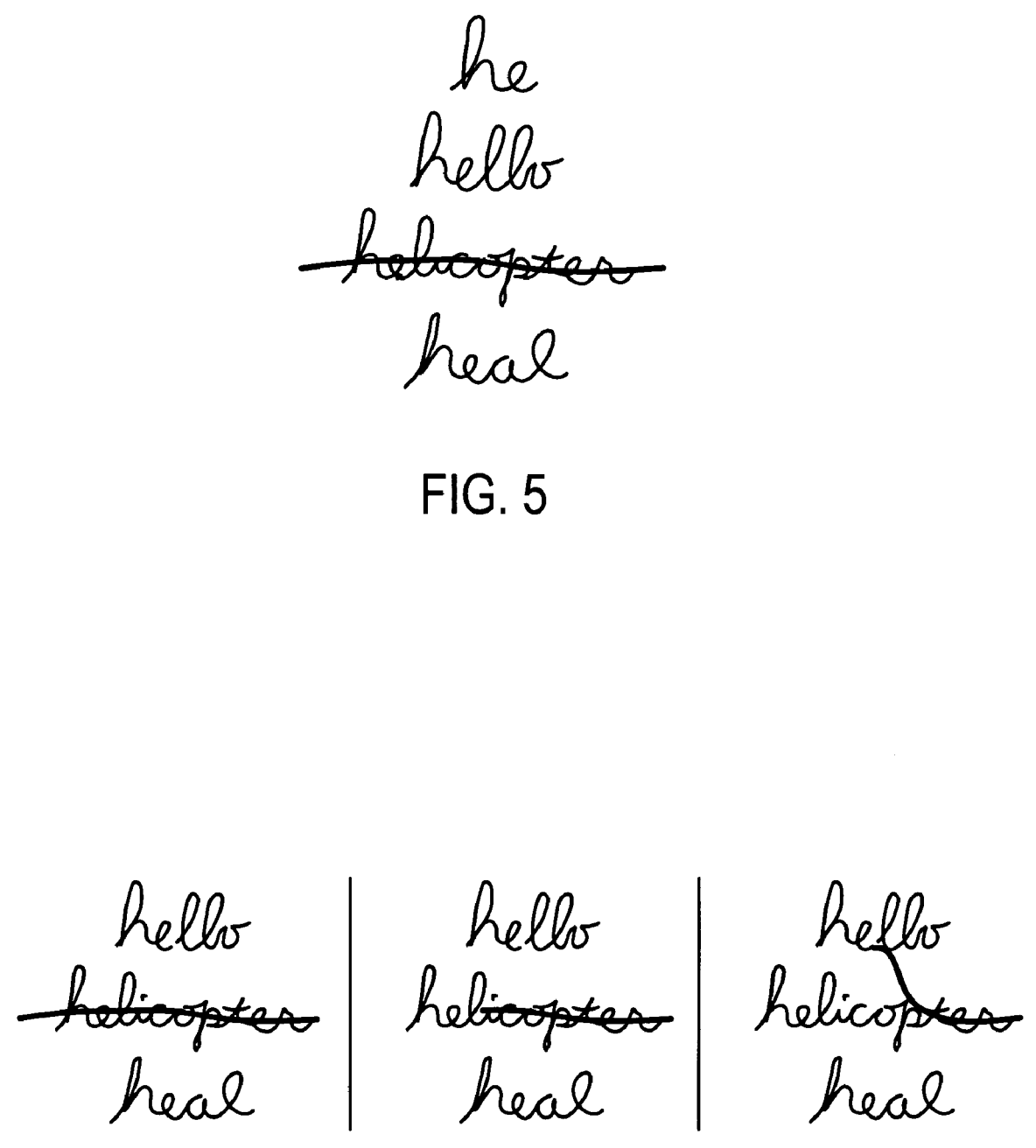

FIG. 5 is a diagram of an exemplary way possible portions may be provided and/or accepted. In the example shown in FIG. 5, the provided pattern is "he" and the system determines that "hello", "helicopter" and "heal" are all possible sequences that include the provided pattern. In this case, more than one possible portion is to be displayed and the system displays the possible portions below the provided pattern. Further, in this example, the system displays the complete possible portions (i.e., not just the remaining portions, such as "llo", "licopter" or "al"). Also, in the example shown in FIG. 5, the provided/displayed possible portion "helicopter" is selected when the user draws a line through the word.

FIG. 6 is a diagram of another exemplary way possible portions may be provided and/or accepted. Similar to the example shown in FIG. 5, the provided pattern is "he" and the determined possible portions are "hello", "helicopter" and "heal". In this example, the system provided one of the determined possible portions as a remaining portion "llo" and the others possible portions are displayed in full below the provided pattern. The system may randomly select one of the multiple possible portions to display in remaining possible portion form adjacent to the provided pattern or the system may select which possible portion to display in remaining possible portion form adjacent to the provided based on the likelihood that the remaining possible portion completes the intended sequence.

Further, in the example shown in FIG. 6, the same scenario is shown in the three columns of the Figure. The left column shows an example where a user selects the provided possible portion "helicopter" by drawing a line through the entire word. The middle column shows an example where a user selects the provided possible portion "helicopter" by drawing a line through the remaining portion "licopter". The right column shows an example where a user actually refrains from lifting, for example, the movable member from the surface of the receiving portion of the information processing system and draws a line into a portion of the (e.g. not even the entire remaining portion) of the possible portion "helicopter". As discussed above, it is also possible, for example, to select a provided possible portion or remaining portion by tapping on it.

Figure 7:
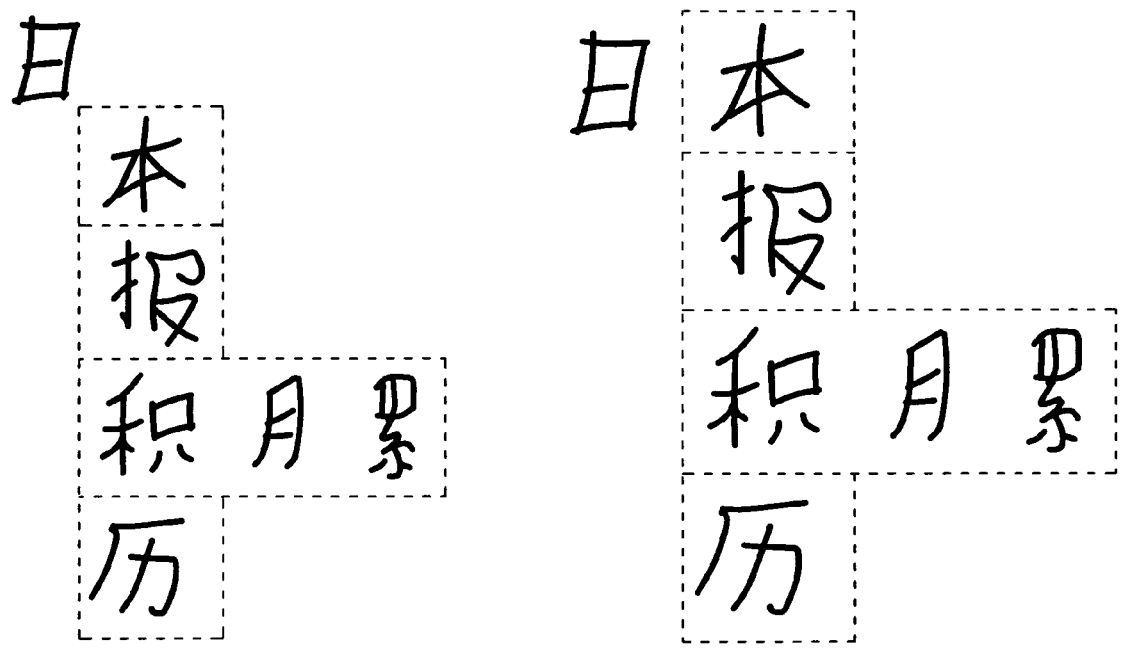
FIG. 7 is a diagram of an exemplary possible portion that is providing Asian characters.

FIG. 7 is a diagram of an exemplary possible portion providing Asian characters. In the example illustrated, the possible portion may also be provided below or adjacent to the provided pattern, etc. For example, in the left side of the Figure, the provided possible portion is provided to the right of and below the provided pattern while the provided possible portion in the right side of the Figure is provided to the right of the provided pattern.

Figure 8:
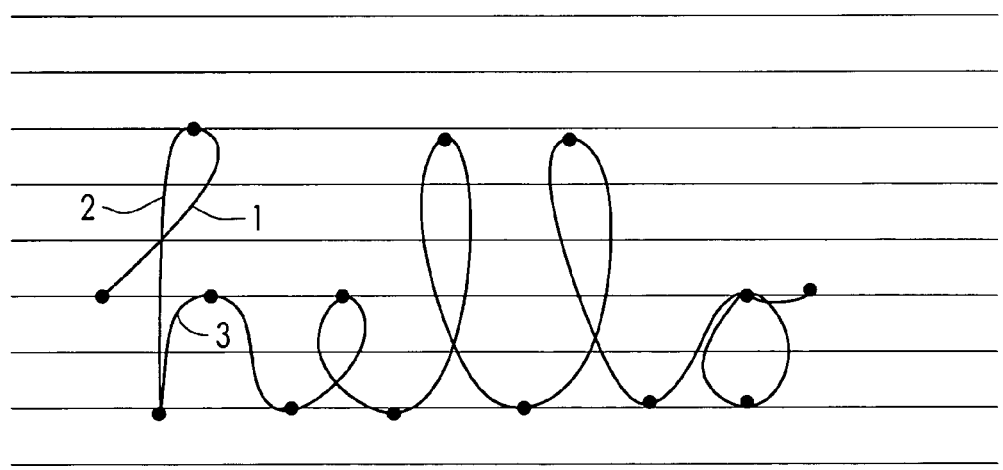
FIG. 8 is a diagram of exemplary ink stroke segmentation scenario.

FIG. 8 is a diagram of exemplary ink stroke segmentation scenario. As discussed above, a provided pattern may be analyzed based on segments and/or strokes used to create the pattern. As illustrated in FIG. 8, portions of the word "hello" identified with dots correspond to relative maximum and minimum portions. For example the left-most dot corresponds to the start of the word and the start of the first segment 1 that ends at the top-most portion of the letter "h". The second segment 2 begins from the top-most portion of the letter "h" and ends at the bottom of that segment (i.e., where the direction of motion changes by the user either lifting the electronic pen, for example, or moving the electronic pen back up substantially along the last portion of the path before beginning to arch up and to the right to generate the third segment 3 of the letter "h". The information acquired from such a segmentation analysis is helpful to identify components of the provided pattern and/or to determine possible portions for the provided pattern.

Figure 9:
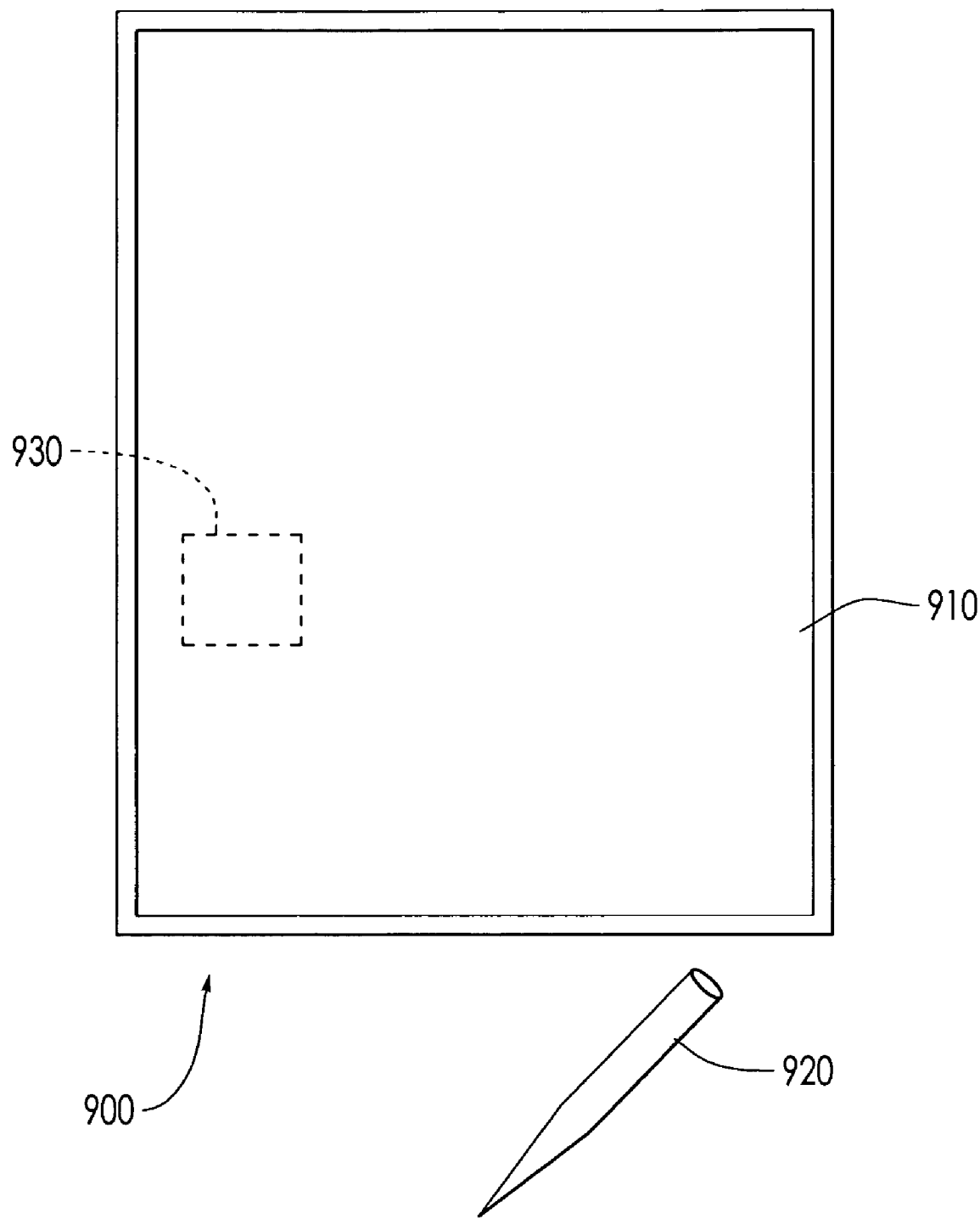
FIG. 9 illustrates an exemplary information processing system including an exemplary movable member.

FIG. 9 illustrates an exemplary information processing system 900, such as a PDA, which includes a receiving portion 910. The exemplary electronic pen 920 may be used to provide patterns on the receiving portion. The exemplary information processing system includes a processor 930 for carrying out, for example, word processing, calendar entry, etc. The processor 930 is also capable of carrying out the steps of the exemplary methods for providing possible portions, described above.

While the exemplary embodiments have been outlined above, many alternatives, modifications and variations will be apparent to those skilled in the art. Accordingly, the exemplary embodiments, as set forth above, are intended to be illustrative and not limiting.

What is claimed is:

1. A possible portion providing method for completing handwritten patterns entered by a movable member on a receiving portion of an information processing system having a processor, the method comprising:
    receiving a handwritten pattern corresponding to a portion of an intended sequence from a user;
    displaying the handwritten pattern to obtain a displayed handwritten pattern;
    determining a possible sequence beginning with the handwritten pattern and ending in a remaining portion, the possible sequence predicting the intended sequence;
    displaying the possible sequence to the user by continuing on from the displayed handwritten pattern and completing the displayed handwritten pattern with the remaining portion; and
    receiving a selection or a rejection of the remaining portion from the user,
    wherein the receiving of the selection includes receiving a line indicating the remaining portion from the user,
    wherein the processor performs the method.

2. A possible portion providing method for completing handwritten patterns entered by a movable member on a receiving portion of an information processing system having a processor, the method comprising:
    receiving a handwritten pattern corresponding to a portion of an intended sequence from a user;
    displaying the handwritten pattern to obtain a displayed handwritten pattern;
    determining a possible sequence beginning with the handwritten pattern and ending in a remaining portion, the possible sequence predicting the intended sequence;
    displaying the possible sequence to the user by continuing on from the displayed handwritten pattern and completing the displayed handwritten pattern with the remaining portion; and
    receiving a selection or a rejection of the remaining portion from the user,
    wherein determining a possible sequence includes determining a plurality of possible sequences beginning with the handwritten pattern and ending in a plurality of remaining portions, the plurality of possible sequences corresponding to different predictions of the intended sequence, and
    wherein the receiving the selection from the user includes receiving a line starting from the handwritten portion and continuing through a selected one of the plurality of possible sequences,
    wherein the processor performs the method.

3. The method of claim 1,
    wherein the handwritten pattern is being produced by movement of the movable member, by the user, across a surface of the receiving portion of the information processing system, and
    the method further comprising comparing the received hand written pattern to predefined patterns for each of a plurality of components to determine at least one provided component of the intended sequence;
    wherein the possible sequence is at least one possible sequence which includes the at least one provided component,
    wherein the remaining portion is a component of the at least one possible sequence other than the at least one provided component;
    wherein the remaining portion resembles a pattern which would be produced if the user or another user continued input beyond the handwritten pattern in the receiving portion of the information processing system using the movable member.

4. The possible portion providing method of claim 3, wherein comparing the received pattern to predefined patterns comprises comparing a direction of motion of the movable member in order to provide the received pattern to a direction in which the movable member or another movable member was moved to provide the predefined patterns to determine the at least one provided component.

5. The possible portion providing method of claim 3, wherein the predefined pattern for each component was generated by the user by moving the movable member to provide the predefined pattern for each component at a previous point in time.

6. The possible portion providing method of claim 3, where the movable member is an electronic pen.

7. The possible portion providing method of claim 3, wherein the at least one possible sequence is determined by determining at least one possible sequence based on at least one of sequences commonly used by the user and sequences for predefined words, characters and phrases.

8. The possible portion providing method of claim 3, wherein the at least one possible sequence is determined by determining at least one possible sequence based on a predetermined number of sequences entered most recently by the user or another user.

9. The possible portion providing method of claim 3, further comprising detecting whether the user is requesting that the information processing system determine at least one possible sequence.

10. The possible portion providing method of claim 9, wherein detecting comprises detecting lifting of the movable member away from the receiving portion of the information processing system.

11. The possible portion providing method of claim 3, wherein the information processing system automatically provides possible portions after a pattern is received.

12. The possible portion providing method of claim 3, wherein the at least one possible sequence is determined by determining a most likely possible sequence from the at least one possible sequence which includes the at least one provided component based on at least one condition, set by the user, for determining the at least one possible sequence.

13. The possible portion providing method of claim 3, wherein the intended sequence is a phrase, the received pattern is at least one word or letter of the phrase, and the at least one remaining component is at least one other word of the phrase.

14. The possible portion providing method of claim 2, further comprising:
    wherein the handwritten pattern corresponds to a traveling path of the movable member, and
    wherein the remaining portion is displayed using a predefined font set for a plurality of components, the predefined font set including a record of a pattern corresponding to the traveling path of the movable member or another movable member for each of the plurality of components.

15. The possible portion providing method of claim 14, wherein determining at least one possible sequence comprises comparing the received handwritten pattern to a general shape of at least one of a previously received pattern or a typeset version of at least one of a character, a letter, a word and a symbol.

16. The possible portion providing method of claim 14, further comprises determining at least one component of the intended sequence.

17. The possible portion providing method of claim 16, wherein the at least one component is one of a letter, a character, and a symbol in one of typeset and non-typeset form.

18. The possible portion providing method of claim 17, wherein determining at least one possible sequence comprises determining a category type of each of a plurality of determined components of the intended sequence in order to determine a category sequence for the intended sequence comprising each of the determined categories for the determined components of the intended sequence and determining at least one possible sequence of components, from a predefined set of components, which can be identified using the determined category sequence for the intended sequence.

19. The possible portion providing method of claim 14, wherein displaying a remaining portion of the at least one possible sequence comprises displaying a remaining portion of the at least one possible sequence if the determined possible sequence satisfies a condition.

20. The possible portion providing method of claim 19, wherein the condition is at least one of the determined possible sequence being in a non-typeset font, being related to an identified topic, being previously provided by the user, and being previously provided by another user.

21. The possible portion providing method of claim 14, wherein displaying a remaining portion of the at least one possible sequence comprises displaying a remaining portion of the at least one possible sequence at a position determined based on where in a priority list the determined possible sequence is.

22. An information processing system, comprising:
    a graphical sequence receiving portion, the receiving portion being capable of receiving graphical sequences based on a traveling path of a movable member;
    a processor, the processor determining at least one possible sequence which includes the graphical sequence received by the receiving portion; and
    a display, the display first displaying the received graphical sequence to obtain a displayed graphical sequence and subsequently displaying at least a remaining portion of at least one determined possible sequence, the displayed remaining portion being displayed using a font set generated by a user, the font set comprising a graphical sequence for each of a plurality of components, wherein each graphical sequence was provided by the user by moving the movable member across a surface of the graphical input receiving portion,
    wherein the display is adapted for receiving a selection of the remaining portion, the receiving of the selection including receiving a line indicating the remaining portion,
    wherein the subsequently displaying the at least a remaining portion comprises continuing on from the displayed graphical sequence and completing the displayed graphical sequence.

23. The information processing system of claim 22, wherein the processor determines the at least one possible sequence by determining at least one provided component included in the received graphical sequence.

24. The information processing system of claim 23, wherein the remaining portion is a portion of the determined possible sequence other than the received graphical sequence.

25. The information processing system of claim 23, wherein the processor determines the at least one possible sequence by comparing the received graphical sequence to a database containing at least one of a non-typeset version and a typeset version of each of a plurality of components.

26. The information processing system of claim 22, wherein the display displays the remaining portion of the at least one determined possible sequence if the determined possible sequence satisfies a condition.

27. The information processing system of claim 26, wherein the condition is at least one of the determined possible sequence having been generated in a non-typeset font, the determined possible sequence being related to an identified topic, the determined possible sequence being previously provided by the user, and the determined possible sequence being previously provided by another user.

28. The information processing system of claim 22, wherein the display displays at least the remaining portion of the at least one determined possible sequence at a position determined based on where in a priority list the determined possible sequence is.

29. The method of claim 1, wherein the receiving of the rejection includes receiving an additional handwritten pattern overwriting the remaining portion.

30. The method of claim 1, wherein:
the handwritten pattern is a part of a single word and the possible sequence is a word predicting the single word, or
the handwritten pattern is a complete word and the possible sequence is a phrase including the complete word.

* * * * *